United States Patent [19]
Toby

[11] 3,991,685
[45] Nov. 16, 1976

[54] TRANSFERRING AND ACCUMULATING DEVICE FOR SLICED COMESTIBLE PRODUCTS

[75] Inventor: Max Edward Toby, San Francisco, Calif.

[73] Assignee: Toby Enterprises, South San Francisco, Calif.

[22] Filed: Feb. 25, 1975

[21] Appl. No.: 552,851

[52] U.S. Cl. ................................ 104/165; 198/795; 198/796

[51] Int. Cl.² .......................................... B65G 17/16

[58] Field of Search .............. 53/123; 104/118, 165, 104/147 R, 226, 252; 198/75, 156, 223, 20 R; 214/44 R, 44 A

[56] References Cited

UNITED STATES PATENTS

| | | | |
|---|---|---|---|
| 2,617,546 | 11/1952 | Rosener | 214/44 R |
| 3,770,107 | 11/1973 | Michelbach | 198/156 X |
| 3,797,635 | 3/1974 | Boisen et al. | 104/165 X |
| 3,811,384 | 5/1974 | Brown | 104/147 R |

*Primary Examiner*—Robert Louis Spruill
*Attorney, Agent, or Firm*—Harris Zimmerman

[57] ABSTRACT

A device for transporting sliced comestible product from a slicer and loading the product in packages includes a belt drive system, with a plurality of transfer carriages supported thereon, extending between the slicer and the loader. Each transfer carriage includes a grid of horizontal, parallel tines to support the product. The loader includes a loader carriage slidably depending from a track, and a plurality of hooked tines pivotably secured to the loading carriage. The hooked tines are adapted to rotate down between the transfer tines to remove the product therefrom as the loader carriage translates along the track toward the package to be filled. The loader carriage stops above the package, where side guides grasp the sides of the product as the loader tines swing away. A loader plunger then descends to urge the product into the package. The transfer carriages are slidably supported on the belt drive system, so that one or more transfer carriages may be temporarily stopped on the belts. Thus, the transfer carriages may accumulate product to be packaged, and in this manner adapt the erratic slicer output to the constant packaging machine demand.

10 Claims, 17 Drawing Figures

TRANSFERRING AND ACCUMULATING DEVICE FOR SLICED COMESTIBLE PRODUCTS

BACKGROUND OF THE INVENTION

In the field of packaging sliced comestible products such as meat, luncheon meat, and cheese using high speed packaging and slicing equipment, it is highly desirable to transfer the sliced product quickly from the slicer to the packaging machine, in an effort to avoid contamination of the product. Generally speaking, modern packaging machines run continuously at high speed, whereas slicing machines, although swift, have inherently erratic outputs. This is due to the fact that the comestible product being sliced often comprises a loaf or large piece of meat, and there is an hiatus in the output between the end of one piece and the commencement of slicing of a subsequent piece. Also, the sliced product is generally placed in stacks each of uniform number of slices, each stack being weight checked. Those stacks which do not meet the weight tolerances are removed from the packaging line. Thus the slicer loading and the stack weight check cause the ultimate slicer output rate to vary considerably.

A serious shortcoming in the prior art is that there is no satisfactory means for matching the erratic slicer output to the constant demand of the packaging machine. The stacks of sliced comestible product are extremely fragile, and cannot undergo many handling operations without destroying the integrity of the stack, as well as the appearance of the product. The use of conveyor belts has been attempted, but detaining a stack on a moving conveyor belt causes the destruction of the bottom slice of comestible. Conveyors comprising rollers have been tried, but the rollers accumulate product fragments and fat which interfere with the rollers and cause unsanitary conditions.

In the actual packaging of the stacks of sliced product, vacuum formed plastic packages are often employed. The container is pre-formed, filled with the stack, and sealed. Since the packages are dimensioned to fit the stack very closely, there is no room for an individual to manually place the stack in the container. Furthermore, accidental contamination of the open end of the container with grease from the hands of the person loading may prevent the securance of a good vacuum seal on the container, allowing the comestible product to spoil. Thus the person loading must be not only quick, but also accurate and clean.

SUMMARY OF THE INVENTION

The present invention comprises a device which receives stacks of a sliced comestible product, accumulates a backlog of the stacks to meet the demand of a packaging machine, and loads each stack in the packaging containers. The invention includes a transfer line which comprises three parallel driven belts in vertically adjacent relationship, and a plurality of transfer carriages supported on a track adjoining the belts. The transfer carriages each include a set of horizontally disposed parallel tines for supporting the stack of slices, and a pair of pressure pads for frictionally engaging the upper and lower pair of drive belts. Two rollers are provided to engage the middle belt.

The transfer line extends to a loader which is disposed above a moving web of preformed containers. The medial transfer drive belt is shorter than its counterparts, extending almost to the loader. The pressure pads and rollers are adapted to gradually tip the set of tines downward toward the containers as the medial belt breaks engagement with the roller. A stop latch on the loader is adapted to engage a stop dog extending from each transfer carriage, retaining the transfer carriage as the belts slide by. A plurality of carriages may be backlogged in this manner, and released by the latch at the rate demanded by the loader.

The loader includes opposed rails extending over the packaging web and which slidably support a loader carriage. A set of hooked tines are pivotally secured to the loader carriage, and are disposed to swing down and interdigitate with the tines of a transfer carriage when the latter has translated to the appropriate unloading position. The loader carriage translates along the rails away from the drive belts, removing the stack from the transfer carriage. As the loader rails are slanted downwardly toward the containers, the loader carriage also descends as it approaches the container to be filled.

At the end of the loader rails is disposed a pair of opposed side support guides which are situated just above the opening of the container to be filled, and which are pivotally secured to a drive link. As the drive link is actuated, the side support guides close on the stack situated on the loader carriage, retaining the stack as the carriage withdraws back up its rails. A plunger disposed above the side support guides then descends, pushing the stack into the cavity of the container. The plunger retracts, the side support guides open, the web of containers advances to present a new, unfilled container, and the loading process is repeated.

THE DRAWINGS

DESCRIPTION OF THE PREFERRED EMBODIMENT

Figure 1:
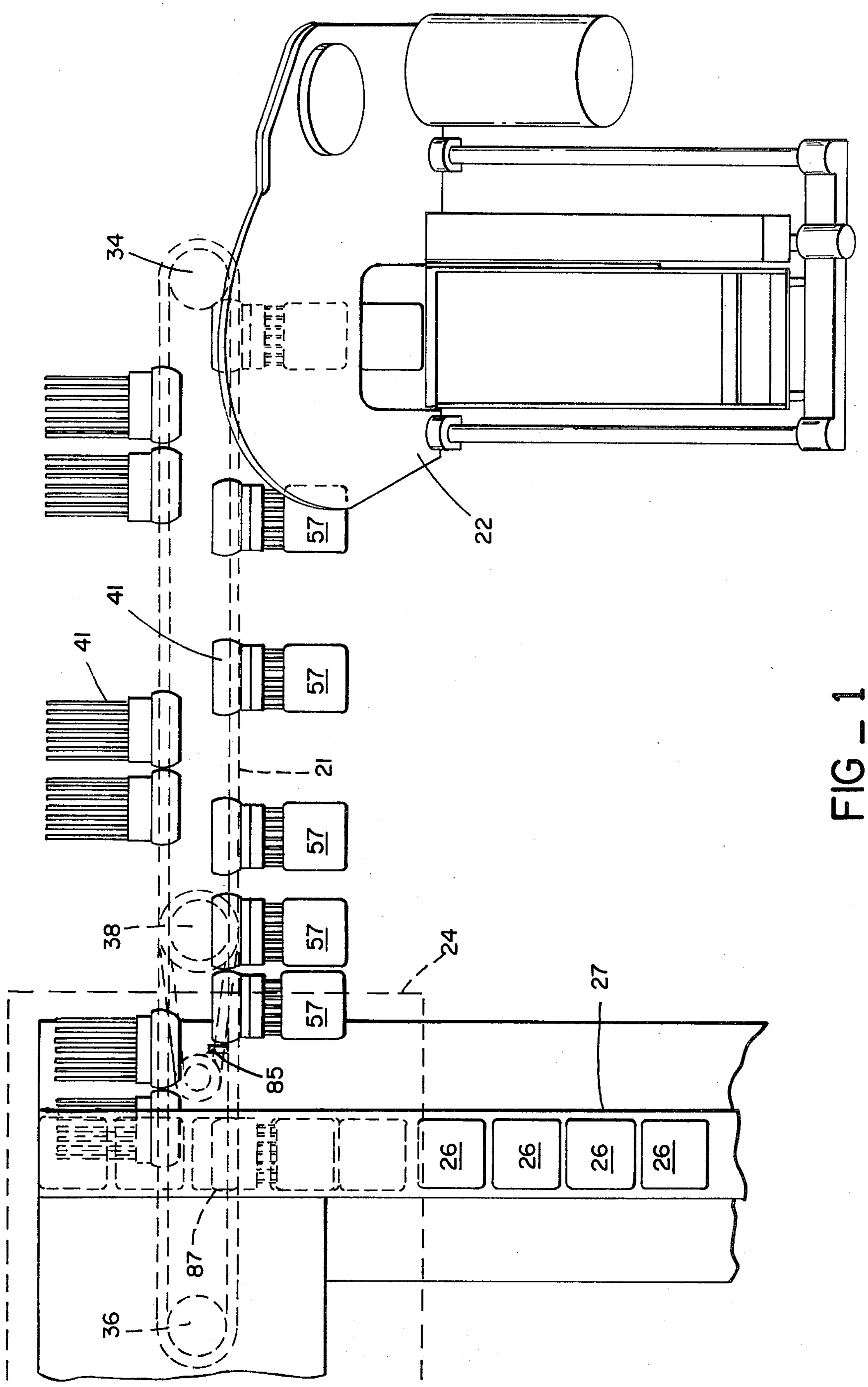
FIG. 1 is a general plan view of the loader and transfer line of the present invention.
Figure 3:
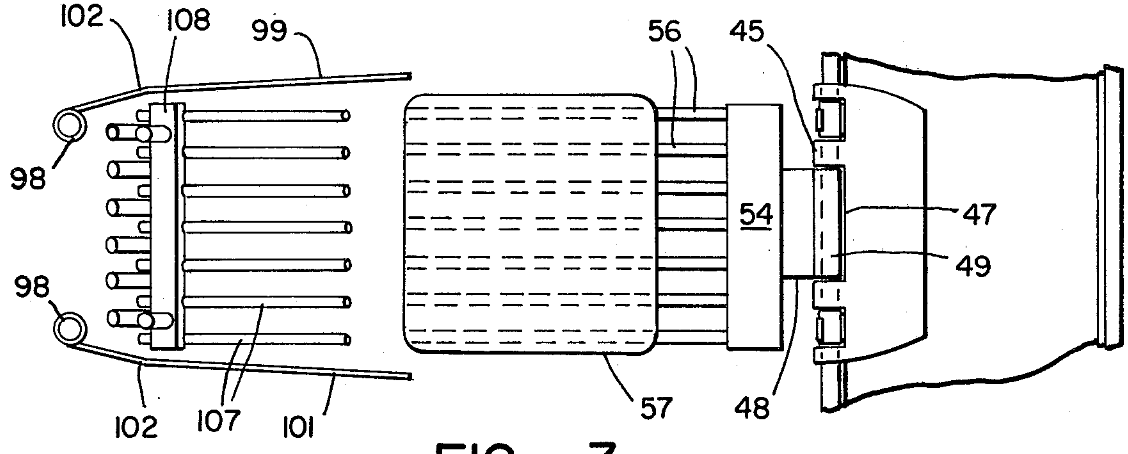
FIG. 3 is a top view of elements as depicted in FIG. 2.

The present invention comprises a device which receives stacks of slices of a comestible product, accumulates the stacks on a transfer line which moves the stacks to a loader, and loads the stacks into containers. As shown in FIG. 1, the invention generally includes a transfer line 21 which is of the endless belt construction. The line circulates about guide wheels beneath the output of a standard comestible product slicer 22 and to a loader 24 which loads the stacks into containers 26. The containers may preferably be of the prefabricated vacuum-formed variety, carried on a web 27 passing beneath the loader and transverse to the transfer line.

Figure 2:
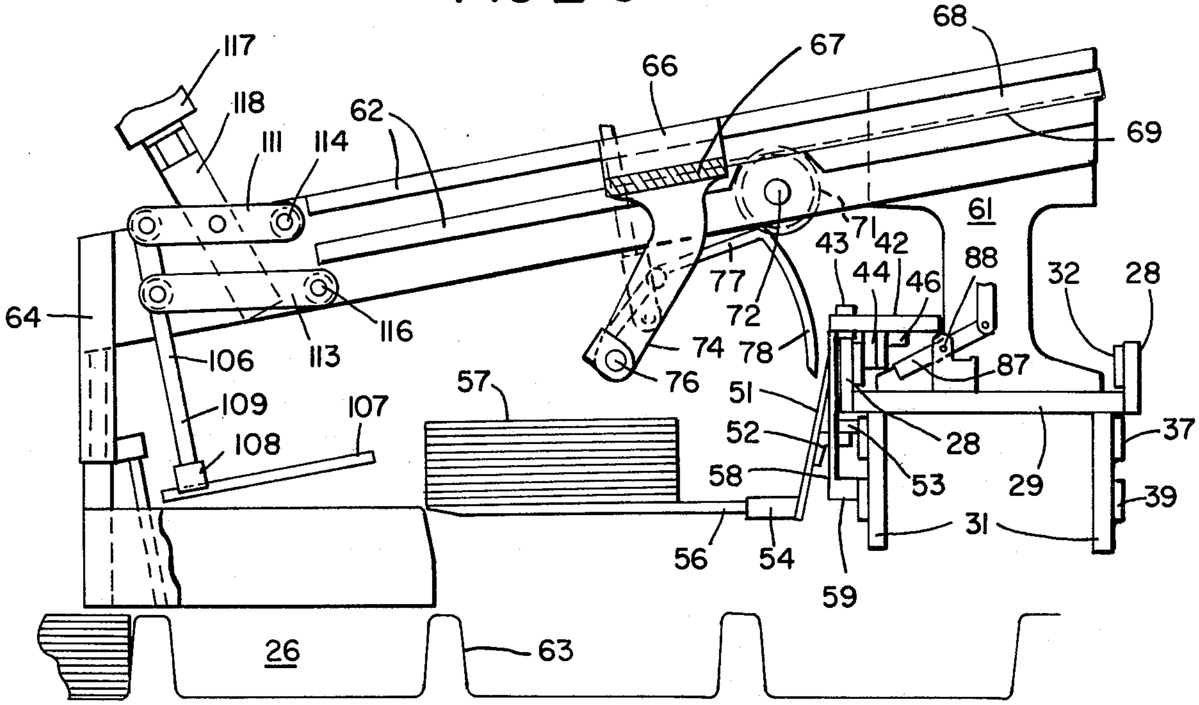
FIG. 2 is a vertical elevation of the loader of the present invention prior to engaging the transfer carriage.
Figure 4:
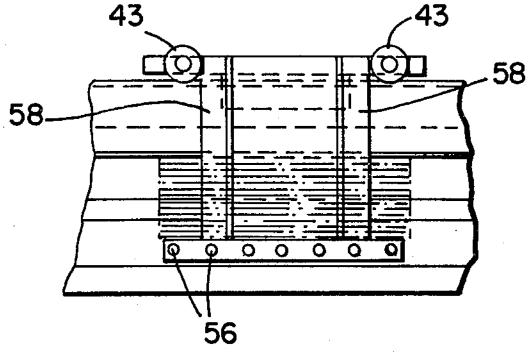
FIG. 4 is a side elevation of the transfer carriage as viewed in FIG. 2.

As shown particularly in FIG. 2, the transfer line includes an upper rail 28 supported by a plate 29. Depending subjacently from the plate 29 is a lower rail 31, disposed inside the plane of the upper rail. An endless drive belt 32 translates along the inner surface 33 of the upper rail, driven by drive means known in the art, held in place on the upper rail by appropriately placed idler wheels (not shown) and end wheels 34 and 36. A shorter, medial endless drive belt 37 circulates along the upper exterior surface of the lower rail between wheel 34 and wheel 38 (FIG. 1). A lower endless drive belt 39 circulates along the lower exterior surface of the lower rail between end wheels 34 and 36. All three endless drive belts are driven synchronously.

Supported on the transfer line are a plurality of transfer carriages 41. Each carriage 41 includes an upper plate 42 (FIG. 2) to which is pivotally secured a pair of spaced rollers 43. The rollers impinge on the upper surface of the upper rail, allowing the carriages to freely translate therealong. Depending subjacently from the upper plate 42 is a pressure pad 44 adapted to impinge on the drive belt 32, as will be explained. Adjacent to the pressure pad and also extending downward from the upper plate is a stop dog 46. A slot 47 in the edge 45 of the upper plate is provided with a hinge pin which pivotally secures the upper, hinge end 49 of a support bracket 48.

The support bracket 48 includes a web portion 51 extending generally obliquely downward. An arm 52 extending from the medial back surface of the web 51 supports a roller 53 on a vertical pivot pin. The roller 53 is adapted to impinge on the drive belt 37 to aid in driving the transfer carriage along the transfer line and to support the web 51 in the obliquely downwardly extending position shown in FIG. 2 (approximately 10° from vertical). A lateral bar 54 is secured to the lower end of the web 51, extending obliquely therefrom. Extending horizontally from the bar 54 are a plurality of rigid, parallel tines 56, the distal tines together form a platform which is adapted to receive and support one stack 57 of slices of a comestible product, such as meat, luncheon meat, cheese, or the like.

Extending downwardly from the edge 45 of the upper plate are a pair of vertical support webs 58. Each web 58 terminates in a pressure pad 59 which extends horizontally from the back surface thereof to impinge lightly on the lower drive belt 39. Generally speaking, the rollers 43 constitute a fulcrum at the top of the upper rail, and the combined weight of the support bracket 48, the webs 58, and the stack 57 urge the plate 42 in a clockwise direction as viewed in FIG. 2. The clockwise force has an upward vector component and an inward vector component toward the rollers 43. The inward vector component will cause the pressure pad 44 to frictionally engage the drive belt 32 and urge the transfer carriage forward. The weight also causes the roller 53 to impinge on the drive belt 37 and further aid in translating the carriage along the transfer line in a clockwise direction, as viewed in FIG. 1. The roller 53 supports the bracket 48 in the oblique position with the tines extending horizontally and the stack disposed vertically.

As each transfer carriage passes the wheel 38 the drive belt 37 returns through the lower rail and passes around the wheel 38, leaving the roller 53 unsupported. The support bracket is then forced by its own weight to rotate about the hinge 49 until it impinges upon the vertical support webs 58. This impingement urges the pressure pads 59 into frictional drive engagement with the drive belt 39, so that the drive belts 39 and 32 continue to urge the transfer carriage forward. The rotation of the support bracket just described causes the tines extending therefrom to dip below horizontal (FIGS. 5, 6, and 7), a disposition which allows the loader to easily remove the stack from the tines without damage to the slices or to the integrity of the stack.

Thus the transfer carriages remove the stacks from the slicer and translate them in a vertical disposition to the loader. It should be noted that a weighing device might advantageously be interposed between the slicer and the transfer line, so that only stacks which fall within the accepted weight tolerances are sent to the loader.

The loader 24 includes a base 61 disposed at the end of the transfer line, near the drive wheel 36. Secured to the base are a pair of opposed tracks 62 extending over the transfer line and perpendicular thereto, and inclined downward from the base 61 (FIG. 2). The tracks are disposed above and straddling the packaging web 63, and are supported at the distal end by vertical members 64. Slidably secured in the tracks is a loader carriage 66, which includes a lateral panel 67 from which extend opposed parallel rails 68 slidably secured in the tracks 62. Each rail is provided with a toothed lower surface 69. A shaft 72 extends normally through both tracks, supporting a pair of gear 71 which each mesh with the teeth of each respective surface 69 to drive the loader carriage along the track. The shaft extends through the track nearest the meat slicer, and a pinion gear 73 is mounted on the protruding end of the shaft 72.

Figure 10:
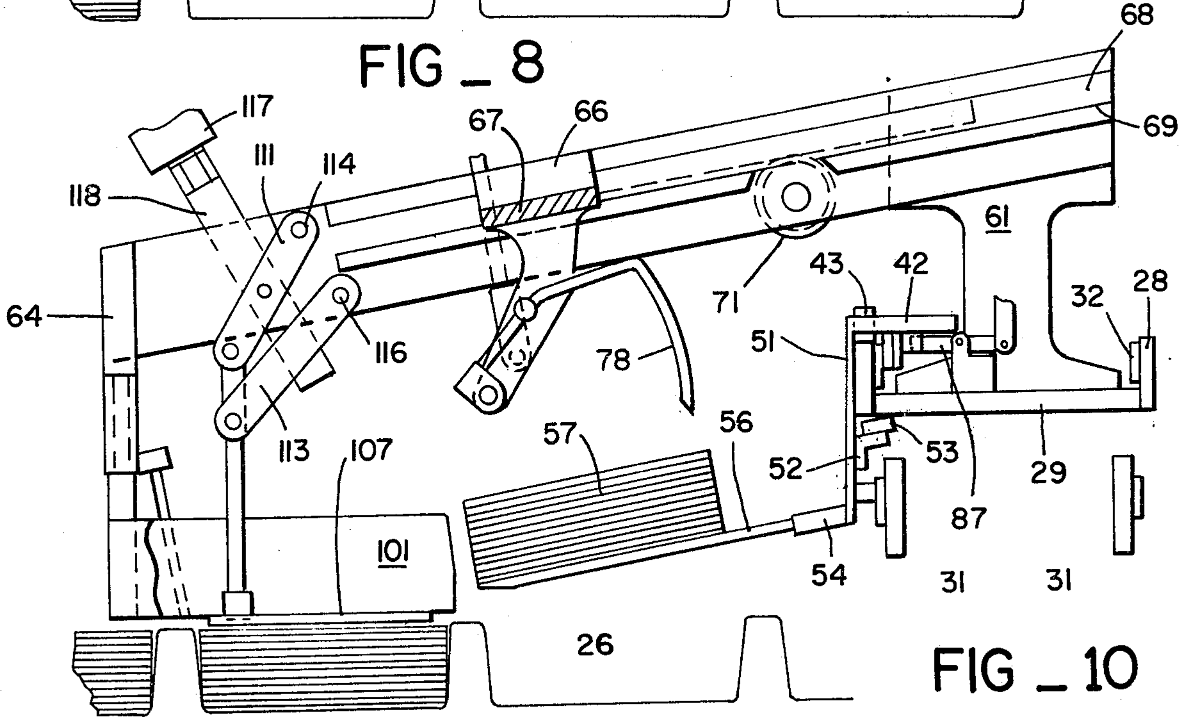
FIG. 10 is a side elevation of the loader filling a container and preparing to engage a following transfer carriage.
Figure 11:
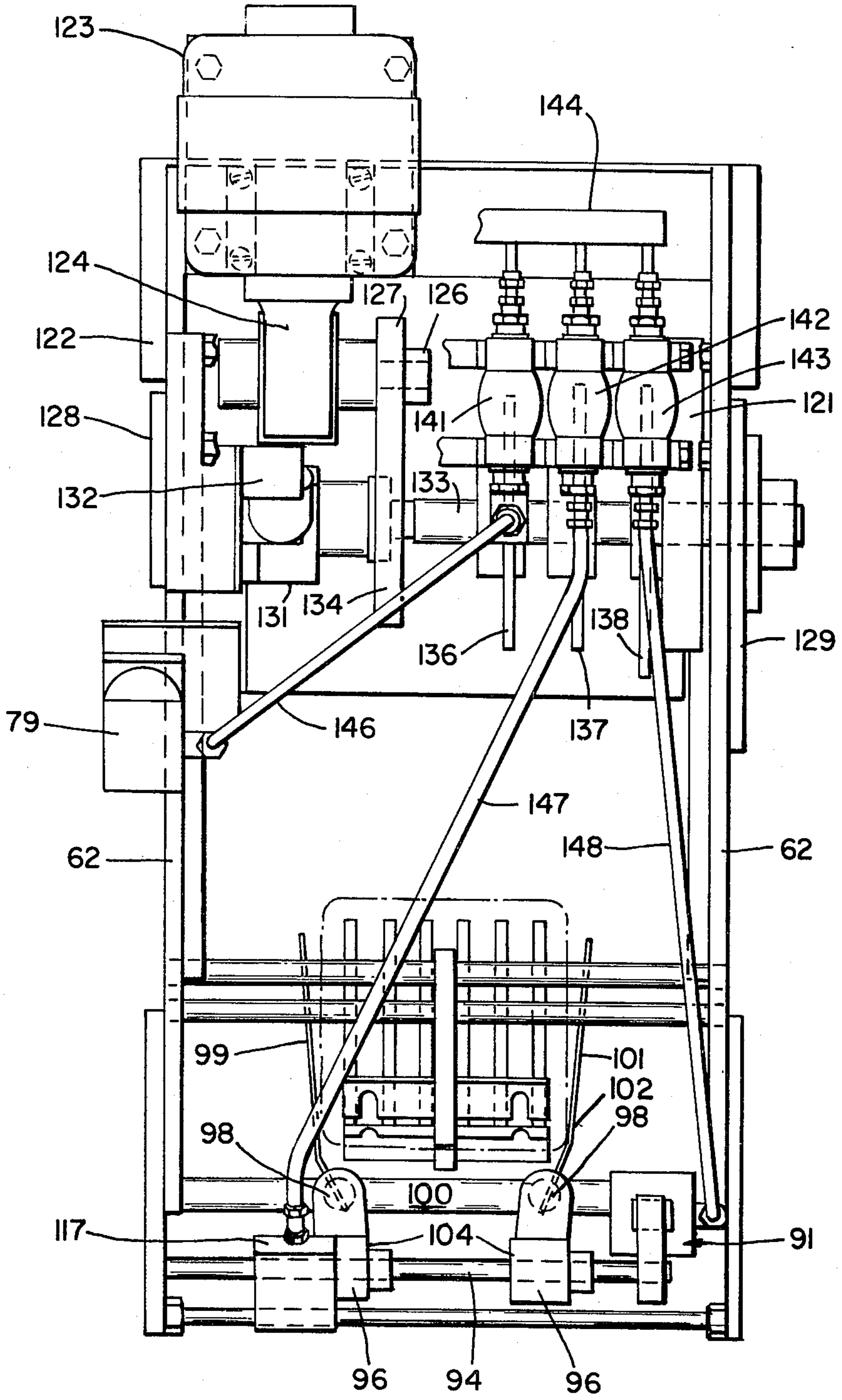
FIG. 11 is a top plan view of the loader of the present invention.
Figure 17:
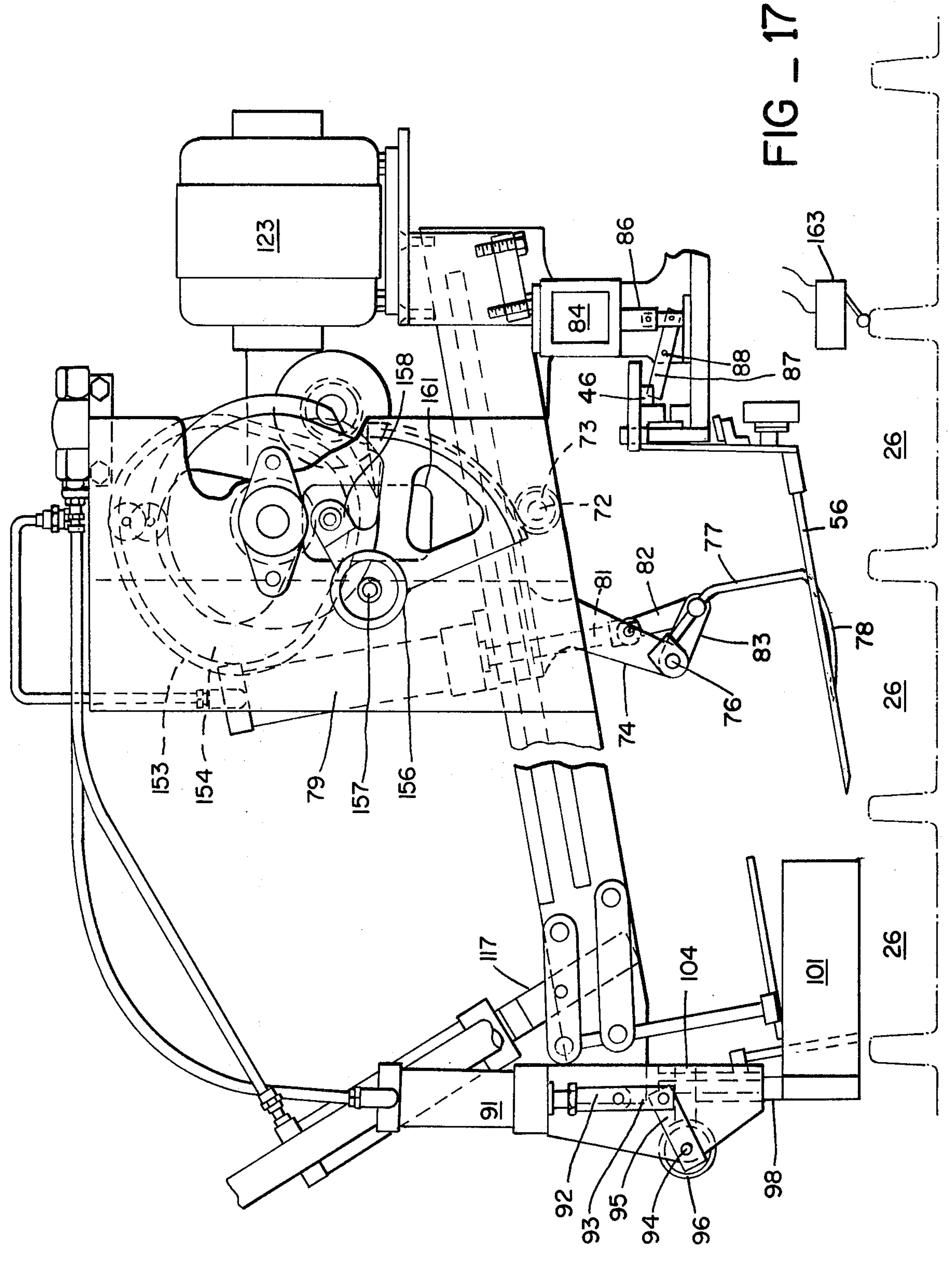
FIG. 17 is a vertical cross sectional view of the loader of the present invention.

Extending subjacently from the lateral panel 67 are a pair of opposed arms 74. A pivot shaft 76 extends between the lower ends of the arms 74. Fixedly joined to the shaft 76 directly above the packaging web is a loader pusher 77, from which extends a set of parallel hooked tines 78. As shown in FIG. 17, a pneumatic cylinder 79 is secured in a generally upright disposition to the loader carriage. The piston rod 81 of the pneumatic cylinder is pivotally secured to an arm or lever 83 extending from the pivot shaft 76. It may be understood that actuation of the pneumatic cylinder causes the piston rod to descend, rotating the pivot shaft by means of the arm or lever and the link and causing thereby the loader pusher to descend to the disposition shown in FIGS. 5, 8, and 17. Retraction of the cylinder likewise causes the loader pusher to retract, as depicted in FIG. 2 and FIG. 10.

Figure 12:
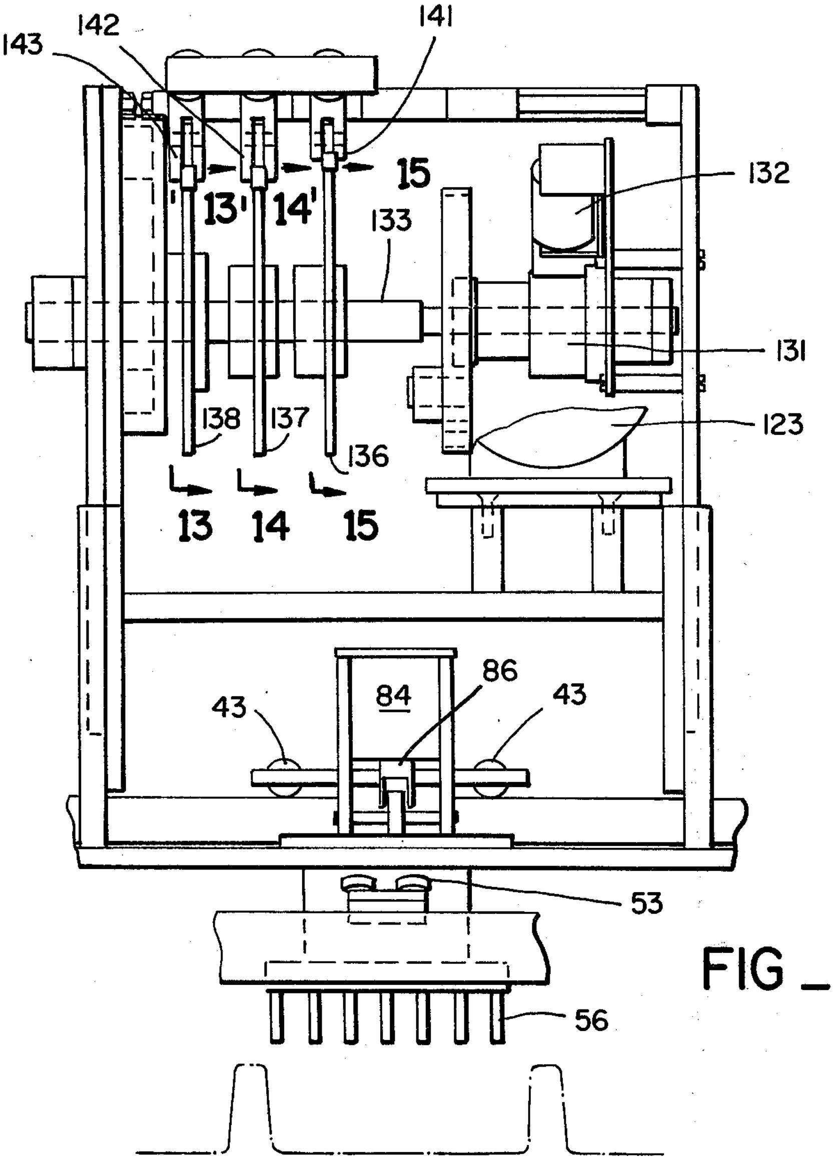
FIG. 12 is a rear elevation of the loader of the present invention.
Figure 13:
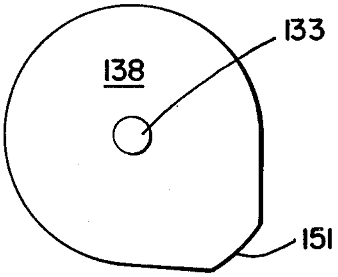
FIG. 13 is a partial cross-sectional view taken along line 13—13 of FIG. 12.
Figure 14:
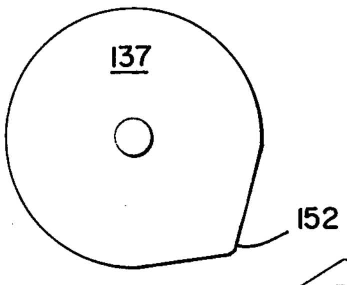
FIG. 14 is a partial cross-sectional view taken along line 14—14 of FIG. 12.
Figure 15:
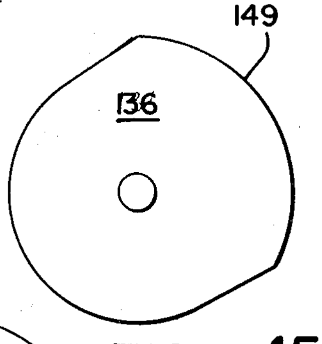
FIG. 15 is a partial cross-sectional view taken along line 15—15 of FIG. 12.
Figure 16:
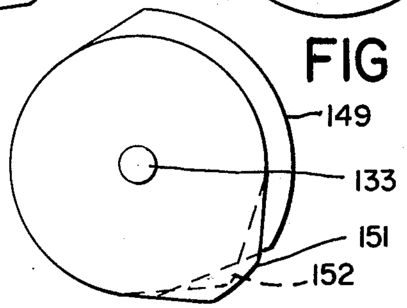
FIG. 16 is a composite view of the elements depicted in FIGS. 13–15.

Joined to the base of the loader is a solenoid 84 which has an armature 86 pivotally joined to latch 87. The latch pivots on pin 88 into and out of engagement with the stop dog 46 depending from each transfer carriage, as shown in FIGS. 12 and 17. Extension of the armature causes the latch to engage the stop dog, thereby detaining any transfer carriage proceeding past. The frictional drive means of the transfer carriages is designed to accommodate such detention without adverse effect. Several carriages may be stopped consecutively or simultaneously by a similar latch 85.

It should be noted that the latch 87 is positioned so that a detained transfer carriage is disposed directly above the packaging web, and between and below the tracks of the loader. Further, the transfer carriage is disposed so that the tines of the loader pusher, which descends after the transfer carriage is stopped, will interdigitate with the tines of the transfer carriage to remove the stack therefrom.

Joined to one vertical member 64 is a downwardly oriented pneumatic cylinder 91. The piston rod 92 of the cylinder is pivotally joined to a linking member 93. Extending horizontally between the vertical members 64 is a pivot shaft 94, which is provided with a pair of double pitch worm gears 96 at opposed ends thereof. An arm 95 extending normally from one end of the shaft is joined pivotally to the linking member 93. Thus actuation of the pneumatic cylinder 91 acts through the linking member 93 and dog 95 to cause the shaft 94 to rotate.

A pair of shafts 98 are journalled, each in a respective vertical member 100, each shaft extending vertically downward from the lower end of the member. A pair of opposed side support guides 99 and 101 are disposed at the lower ends of the shafts 98, each guide secured to its respective shaft. Each guide comprises a laterally extending vertical web provided with a slight bend 102 toward its counterpart. The guides are directly superjacent to the packaging web, straddling the container cavity 26 of the web as it translates thereby. Each shaft is provided with a segment gear 104 secured thereon and disposed to mesh with a worm gear 96. Thus rotation of the shaft 94 by the pneumatic cylinder 91 drives the worm gears to rotate the shafts 98. As the gears 104 are counter-pitched, the shafts 98 rotate in opposite directions, so that the side support guides rotate each toward the other. Deactuation of the cylinder 91 allows them to open.

Disposed above and between the side support guides is a plunger 106, which includes a plurality of parallel tines 107 joined to a bar 108 which is secured to the lower end of a rod 109. At the upper end of the rod are pivotally secured a pair of spaced levers 111 and 113, the levers being disposed intermediate of the tracks. A pair of shafts 114 and 116 extend horizontally between the tracks, passing through the other ends of the levers 111 and 113 respectively. A pneumatic cylinder 117 is secured to a frame (not shown) in a obliquely downward orientation, with the piston rod 118 thereof pivotally joined to the lever 111.

Figure 8:
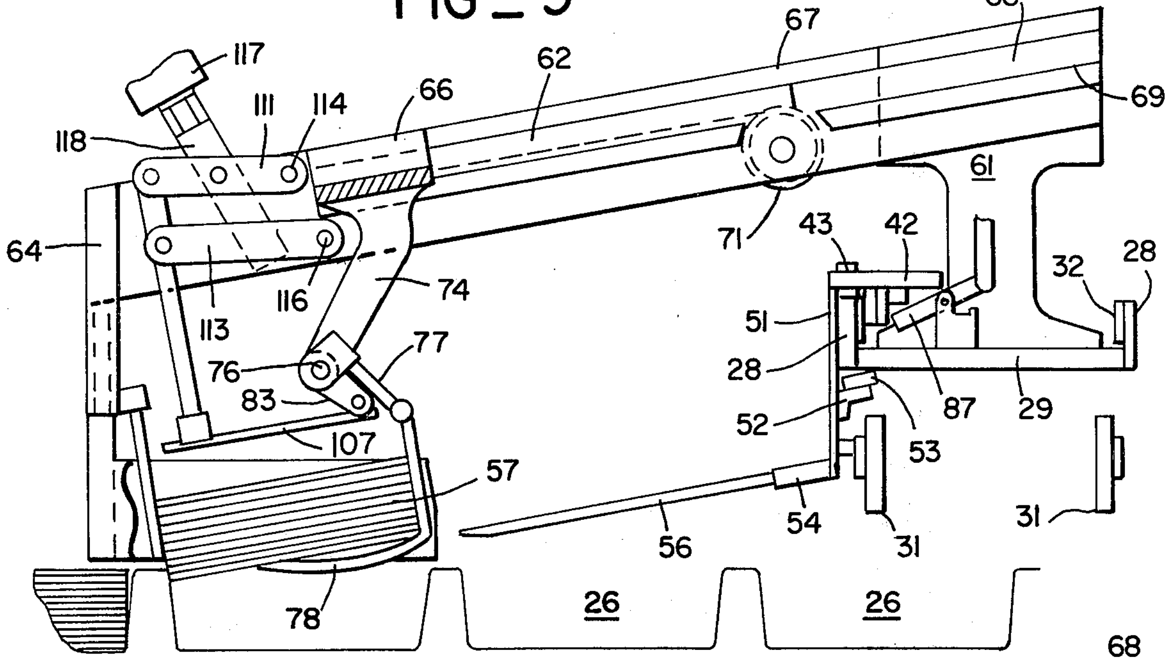
FIG. 8 is a side elevation of the loader just prior to loading a container.

With reference to FIG. 8, it may be appreciated that with the pneumatic cylinder 117 in the retracted position the tines 107 are parallel to the upper surface of the stack which is presented directly therebelow by the loader pusher. After the actuation of the side support guides and the retraction of the loader pusher, the pneumatic cylinder 117 is immediately actuated, causing the plunger to descend. As the plunger descends and pushes the stack of slices into the cavity of the packaging web, the double lever mounting of the rod 109 causes the tines 107 to move to horizontal. As the cylinder fully extends the stack is securely ensconced in the cavity, with the tines parallel to the top surface thereof, as shown in FIG. 10, insuring that the top of the stack is flat. The pneumatic cylinder then retracts, raising the plunger once again to the position shown in FIG. 8.

The actuation of the three pneumatic cylinders, as well as the translation of the loader pusher, is accomplished by a control system 121 which is disposed within a housing 122. The control system includes an electric motor 123 mounted on the base and connected to a gear reduction drive 124, commonly known in the art. The output of the gear reduction is a shaft 126, with a spur gear 127 secured on the distal end thereof. The housing includes a pair of opposed vertically disposed walls 128 and 129, with the reduction drive bolted to the wall 128.

Also secured to the wall 128 adjacent to the reduction drive is a single revolution clutch 131, operated by a solenoid 132. A cam shaft 133 extends from the single revolution clutch to a bearing in the wall 129. Joined to the end of the single revolution clutch is a drive gear 134 which meshes with the spur gear 127. The solenoid 132 actuates the single revolution clutch to transfer rotary power from the drive gear to the cam shaft for only one revolution of the cam shaft. The clutch then automatically disengages.

Secured on the cam shaft are cams 136, 137, and 138. Disposed above the cams and in engagement therewith are cam-actuated pneumatic valves 141, 142, and 143, respectively. All of the valves are supplied with compressed air or other gas through header 144. The output of valve 141 is connected through gas line 146 to the pneumatic cylinder 79, so that cam 136 controls actuation of the loader pusher. The output of valve 142 is connected through gas line 147 to pneumatic cylinder 117, so that cam 137 controls the operation of the plunger. Valve 143 is connected to pneumatic cylinder 91 through gas line 148, so that cam 138 controls the actuation of the side support guides 99 and 101.

The cam shaft rotates counter-clockwise, with reference to the views of FIGS. 13 – 16, so that the broad lobe 149 of cam 136 actuates the loader pusher first and maintains it in the descended position while the stack of slices is taken from the transfer carriage and loaded into the container. Almost simultaneously with the deactuation of the loader pusher by lobe 149, lobe 151 of the cam 138 rotates into valve engagement, causing the side support guides to close and grasp the stack of slices presented by the loader pusher. This actuation is maintained while lobe 152 of cam 137 rotates into valve engagement, causing the plunger to descend and push the stack into the container. The cams then cause the plunger to retract, and the side support guides to open.

Also secured on the cam shaft adjacent to the wall 129 is a cam wheel 153 which is provided with an irregular annular track 154 on the face thereof adjacent to the wall 129. A rack member 156 is pivotally supported on the wall 129 by a pivot pin 157. The rack includes a cam riding arm 158 which extends from the hub of the rack through a window 161 in wall 129, to engage the annular track 154 of the cam wheel. The toothed portion of the rack engages pinion gear 73 so that as the cam shaft describes a single revolution, the cam riding arm pivots the rack reciprocally, causing the loader pusher to be driven by the pinion down the track and to return.

OPERATION OF THE PREFERRED EMBODIMENT

In the normal operation of the preferred embodiment the meat slicer and the packaging machine are presumed to be operating, producing stacks of slices of a comestible material, and sealing the stacks in the containers carried on the packaging web. The drive belts are circulating synchronously and continually, carrying the transfer carriages thereon. A stop latch mechanism 85 may be provided on the transfer line to back up several carriages upstream of the slicer output point. As the slicer operates generally sporadically yet at a greater rate than the packaging machine, the transfer carriages are released past the slicer at the slicer rate, resulting in unequal spacing of the carriages along the transfer line between the slicer and the loader.

The stop latch 87 halts the burdened carriage at the loader directly over the packaging web, after the carriage has tilted as previously explained, and several carriages may be stopped upstream of the loader by the latch 85. A microswitch 163 is disposed in contact with the packaging web, and connected to the solenoid actuator 132 of the single revolution clutch. As the packaging web indexes forward to present the succeeding empty container to the loader, the microswitch is closed, causing the solenoid to actuate and activate the single revolution clutch.

Figure 6:
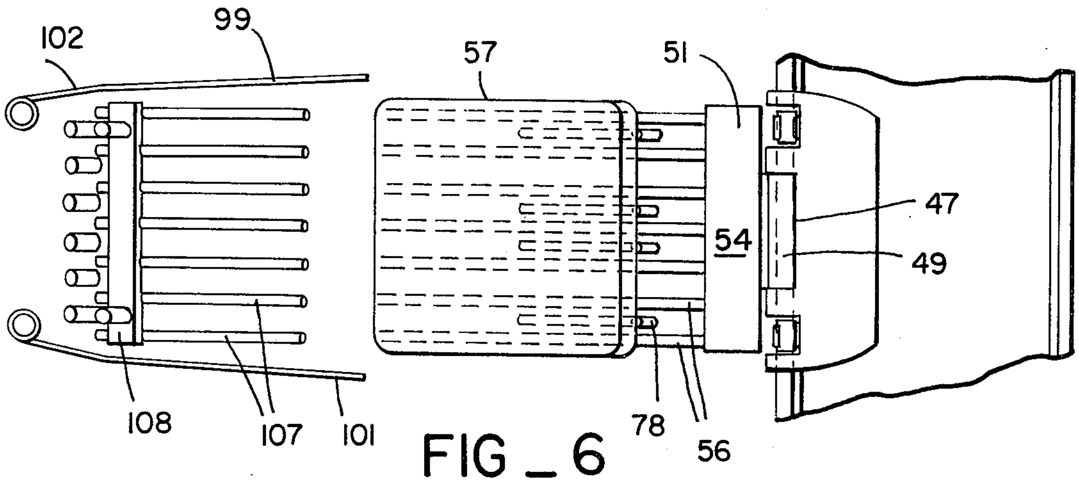
FIG. 6 is a top view of the elements of the present invention as disposed in FIG. 5.
Figure 5:
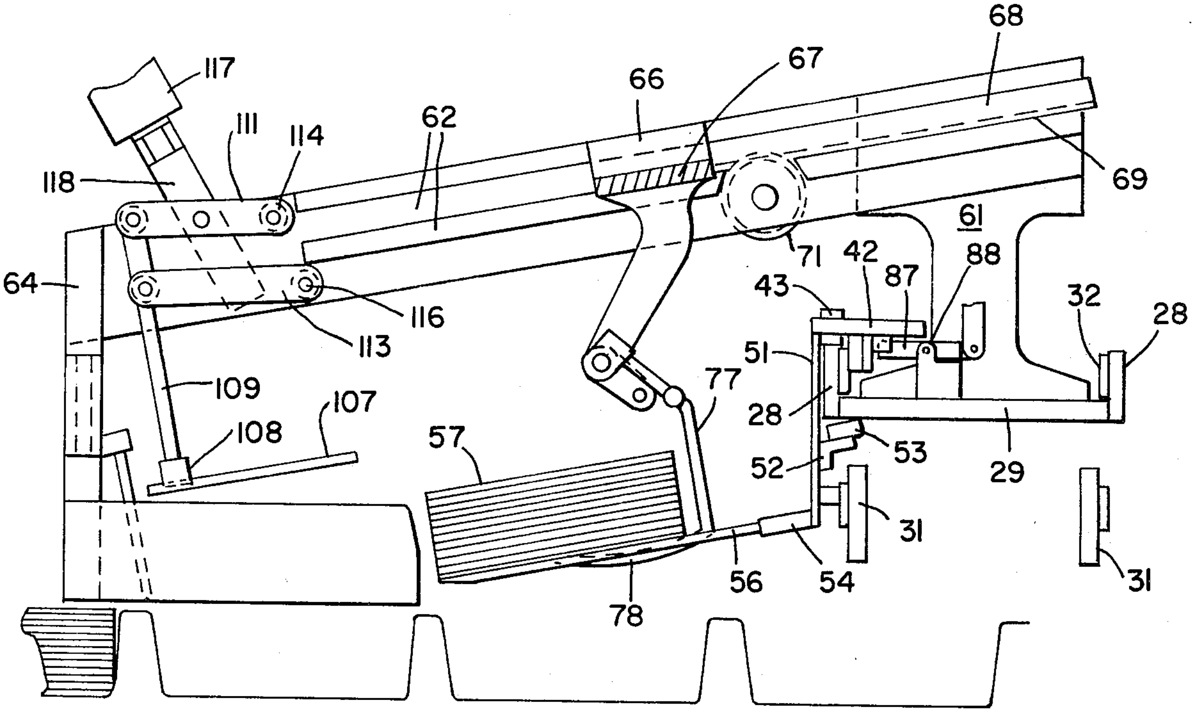
FIG. 5 is a side elevation of the loader engaging a transfer carriage of the present invention.
Figure 7:
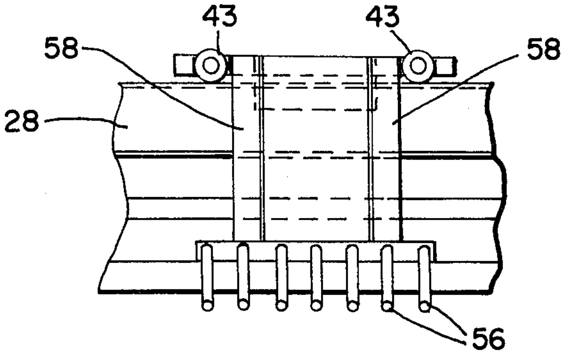
FIG. 7 is a side elevation of the transfer carriage of the present invention isolated in the disposition depicted in FIG. 5.
Figure 9:
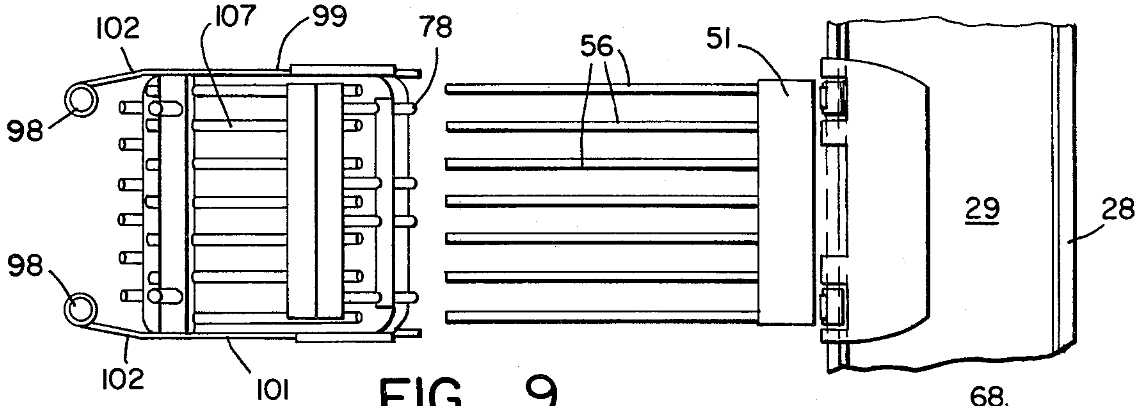
FIG. 9 is a top view of the elements of the present invention as depicted in FIG. 8.

The clutch acts to turn the cam shaft causing the cam 136 to actuate valve 141, causing the pneumatic cylinder 79 to extend and lower the loader pusher (FIG. 5 through 7). The loader pusher descends through the tines of the transfer carriage, and then rack and pinion begin to translate the loader carriage and it in turn translates the stack by the pusher to a disposition above the next empty container and between the side support guides. At the same time, the empty transfer carriage 41 is released by latch 87. The cam 138 actuates valve 143 to cause the pneumatic cylinder 91 to operate. The cylinder 91 drives the shaft 94 to close the side support guides together and grasp the stack as the loader carriage withdraws up the track.

The cam 137 then operates the valve 142, causing the pneumatic cylinder 117 to drive the plunger downward. The plunger pushes the stack into the empty container, (FIG. 10), and withdraws as the side support guides open. As the camshaft completes one revolution the single revolution clutch deactivates, and the loader is set to receive the next transfer carriage.

It should be noted that the present invention is particularly adaptable to loading a plurality of packaging webs simultaneously. In this adaptation, a plurality of loader carriage-plunger-side guide assemblies are provided in parallel, one assembly for each packaging web. In this manner, a plurality of webs may be loaded simultaneously at a rate approximating the single web loading process.

I claim:

1. A device for transferring and accumulating a plurality of articles, comprising transfer line means for receiving each article individually, accumulator means for storing said articles on said transfer line, said transfer line means including laterally disposed rail means, means supporting a plurality of drive webs translating continuously along said rail means, and a plurality of transfer carriages supported on said rail means, means on said carriages for engaging said drive webs and translating said carriages along said rail means, each transfer carriage including a support bracket pivotally secured thereto and depending therefrom, each support bracket including a laterally extending portion for receiving and supporting said articles.

2. The device according to claim 1, wherein said accumulator means includes a stop means for temporarily detaining one or more of said transfer carriages translating along said rail means.

3. The device according to claim 1, wherein said rail means includes a first rail, and a first endless drive web translating along the inner surface thereof.

4. The device according to claim 3, further including a second rail parallel to said first rail and coextensive therewith, and a second endless drive web coextensive with said first endless drive web and translating along the exterior surface of said second rail.

5. The device according to claim 4, further including a third endless drive web translating along said exterior surface of said second rail, shorter in length than said other endless drive webs and disposed therebetween.

6. The device according to claim 5, wherein each of said transfer carriages includes first roller means for supporting said transfer carriage on said first rail.

7. The device according to claim 6, wherein said transfer carriages each include means for frictionally engaging each of said endless drive webs.

8. The device according to claim 7, wherein said last mentioned means includes friction pads for engaging said first and second endless drive webs, and second roller means for engaging said third endless drive web.

9. The device according to claim 8, wherein said second roller means and said third endless belt comprise a lateral support for maintaining said laterally extending portion in a horizontal disposition.

10. The device according to claim 8, wherein said friction pads and said second endless drive web comprise a lateral support for maintaining said support means in a disposition oblique to horizontal.

* * * * *